United States Patent
Joung et al.

(10) Patent No.: US 7,835,313 B2
(45) Date of Patent: Nov. 16, 2010

(54) METHOD OF EXTRACTING WAP DATA USING MOBILE IDENTIFICATION NUMBER

(75) Inventors: Jinsoup Joung, Seongnam (KR); Yeonsong Kim, Seoul (KR); Junghoon Lee, Seoul (KR)

(73) Assignee: Innowireless Co., Ltd., Seongnam (KR)

( * ) Notice: Subject to any disclaimer, the term of this patent is extended or adjusted under 35 U.S.C. 154(b) by 770 days.

(21) Appl. No.: 11/832,118

(22) Filed: Aug. 1, 2007

(65) Prior Publication Data
US 2008/0031171 A1 Feb. 7, 2008

(30) Foreign Application Priority Data
Aug. 4, 2006 (KR) .................. 10-2006-0073806

(51) Int. Cl.
*H04B 7/00* (2006.01)
*H04L 12/26* (2006.01)
*H04L 12/64* (2006.01)
(52) U.S. Cl. .............. 370/310; 370/401; 455/435.1
(58) Field of Classification Search .......... 370/310, 370/328, 254, 255; 455/435.1
See application file for complete search history.

(56) References Cited

U.S. PATENT DOCUMENTS 5,978,669 A * 11/1999 Sanmugam ............. 455/410
6,549,776 B1 * 4/2003 Joong .................... 455/433

* cited by examiner

*Primary Examiner*—Chi H Pham
*Assistant Examiner*—Ahmed Elallam
(74) *Attorney, Agent, or Firm*—Rothwell, Figg, Ernst & Manbeck, P.C.

(57) ABSTRACT

In the WAP data extraction method of the present invention, all of the data packets passing through a WAP gateway are captured. Primary filtering is performed by determining whether each of the captured data packets uses the IP address of the given WAP gateway as an intermediate IP address, or has a port corresponding to a WAP protocol. Whether a Mobile Identification Number (MIN) is present in a header of data filtered in the primary filtering is determined. Whether the MIN is identical to a registered MIN is determined if a MIN is determined to be present. An IP address or a port number included in the header is registered, while the data packet is stored if the MIN is determined to be identical to the registered MIN. Secondary filtering is performed on the data packet having the IP address or the port number, and data filtered through the secondary filtering is stored.

15 Claims, 2 Drawing Sheets

[Fig. 1]
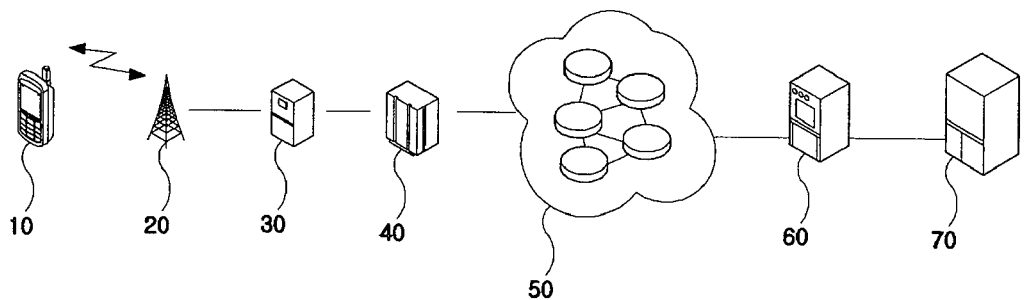
[Fig. 2]
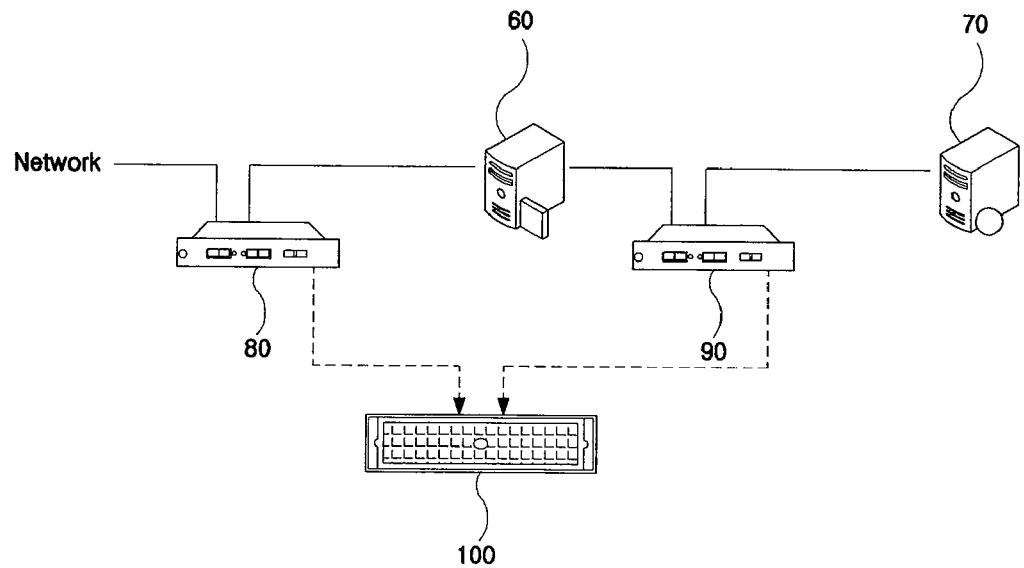

[Fig. 3]
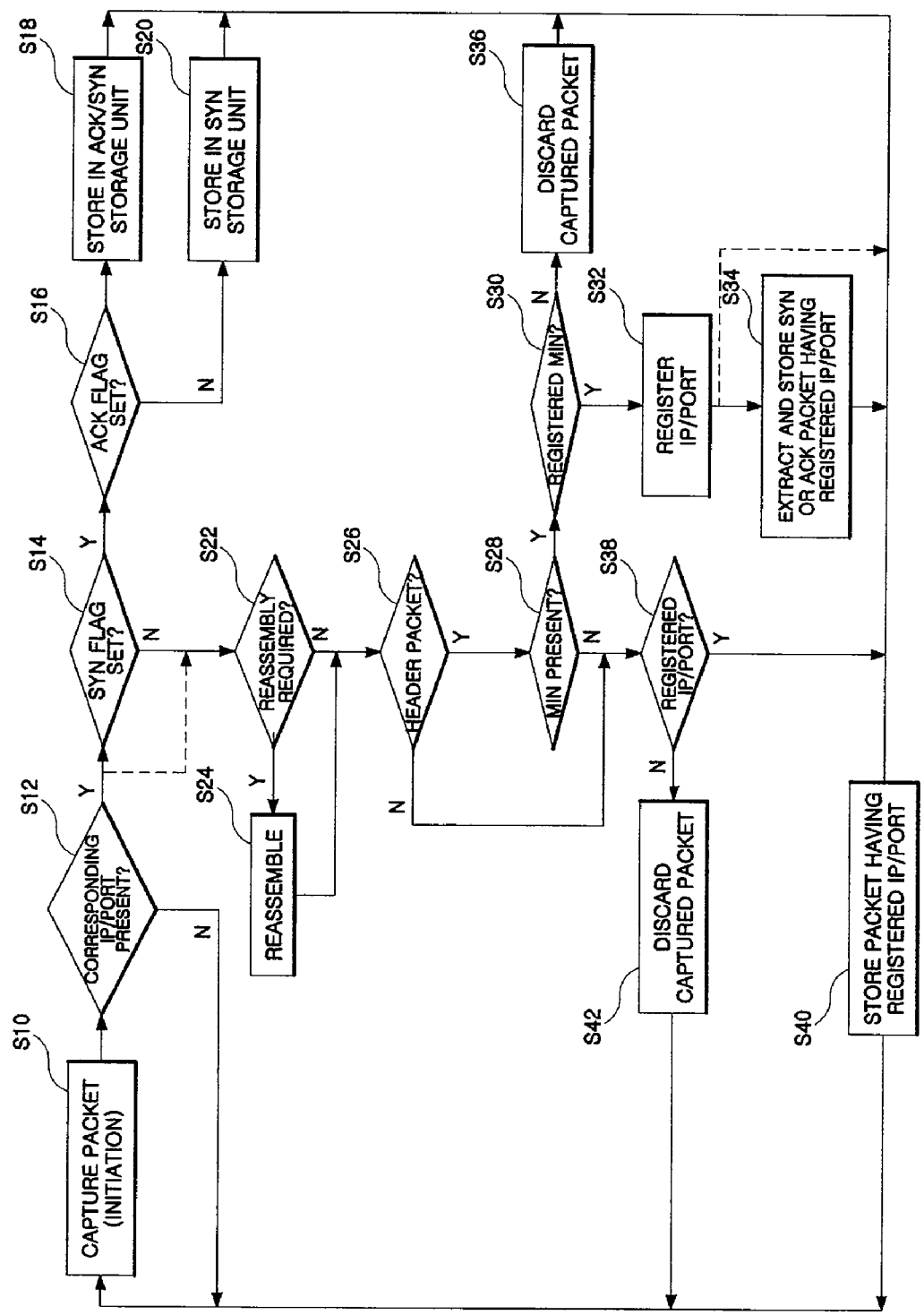

METHOD OF EXTRACTING WAP DATA USING MOBILE IDENTIFICATION NUMBER

RELATED APPLICATIONS

The present disclosure relates to subject matter contained in priority Korean Application No. 10-2006-0073806, filed on 4 Aug. 2006 which is herein expressly incorporated by reference in its entirety.

BACKGROUND OF THE INVENTION

1. Field of the Invention

The present invention relates, in general, to a method of extracting WAP data using a mobile identification number and, more particularly, to a method of extracting WAP data using a mobile identification number, which uses a mobile identification number, which is a static factor, rather than an IP address, which is typically regarded as a dynamic factor and is difficult to handle, thus more promptly and precisely extracting WAP data.

2. Description of the Related Art

As well known to those skilled in the art, wired Internet environments are based on a network capable of providing desktop or higher class computers and high bandwidth. However, in mobile wireless communication environments, there are many difficulties in gaining access to the network from current desktop computers, from the standpoint of power consumption, memory capacity, display size, transfer rate, and stability. Therefore, it is difficult to use the standards of the wired Internet in mobile wireless communication environments without change, and accordingly, a Wireless Application Protocol (WAP) has been proposed to satisfy the activity of creating protocols suitable for mobile wireless communication environments without greatly deviating from basic standards.

The purpose of such a WAP is to develop wireless protocol standards, content, and application technology, which can be operated in Internet services using wireless terminals, such as mobile phones, and other types of wireless communication technologies. In this case, in order to use conventional wireless networks together with the WAP, a WAP gateway (also called a WAP proxy) is required. Further, the WAP gateway performs a required method for connecting the wireless mobile communication network, which uses WAP protocols, that is, a Wireless Session Protocol (WSP), a Wireless Transaction Protocol (WTP), and a Wireless Datagram Protocol (WDP), to the wired communication network, which uses the Internet protocols, such as a Hyper-Text Transfer Protocol (HTTP), a Transmission Control Protocol (TCP), a User Datagram Protocol (UDP), and an Internet Protocol (IP), for example, protocol conversion, encoding/decoding, etc.

Meanwhile, a mobile communication service provider must extract WAP data passing through a WAP gateway so as to provide high-quality WAP services to subscribers, and in particular, must extract and analyze WAP data about the mobile station of a subscriber who complains about trouble when using WAP service.

For this operation, in the prior art, a method of measuring traffic obtained from a stage previous or subsequent to a WAP gateway to be measured, using dedicated network monitoring equipment, finding the mobile IP address of a given mobile station, and thereafter extracting data having the IP address, was performed.

However, the conventional method of personally finding an IP address and extracting data is inconvenient in that a personal inquiry must be made to the manager of a mobile communication company about the IP address of a given mobile station. Further, the conventional method has a temporal restriction in that, when the IP address is a dynamic IP address, the IP address must be found at the time at which data was extracted. Moreover, an IP address does not have a familiar number system, compared to a mobile identification number, and is a relatively long number having many digits, so that it is difficult to handle the IP address. Furthermore, in the case of IPv6, which will be provided in the future, an IP address is a considerably long number, having a total of 128 bits, and thus the handing of the IP address becomes more complicated.

SUMMARY OF THE INVENTION

Accordingly, the present invention has been made keeping in mind the above problems occurring in the prior art, and an object of the present invention is to provide a method of extracting WAP data using a mobile identification number, which uses a mobile identification number, which is a static factor, so that there is no need to personally inquire of a manager about an IP address assigned to a given mobile station in a temporal restriction, thus more conveniently and promptly extracting WAP data.

In order to accomplish the above object, the present invention provides a method of extracting Wireless Application Protocol (WAP) data, comprising the steps of (a) capturing all data packets passing through a WAP gateway; (b) performing primary filtering by determining whether each of the captured data packets uses an Internet Protocol (IP) address of the given WAP gateway as an intermediate IP address, or has a port corresponding to a WAP protocol; (c) determining whether a Mobile Identification Number (MIN) is present in a header of a data packet filtered at the primary filtering step; (d) determining whether the MIN is identical to a registered MIN if the MIN is determined to be present in the step (c); (e) registering an IP address or a port number included in the header while storing the data packet if the MIN is determined to be identical to the registered MIN in the step (d); and (f) performing secondary filtering on the data packet having the IP address or the port number, and storing a data packet filtered through the secondary filtering.

Preferably, the data packet in the step (a) may be extracted from at least one of stages previous and subsequent to the WAP gateway. Preferably, when the data packet, filtered in the primary filtering step, is a fragmented data packet, the data packet may be reassembled, and thereafter the step (c) may be performed.

Preferably, the data packet may be a data packet based on a User Datagram Protocol (UDP) or a Transmission Control Protocol (TCP). The method may further comprise the steps of, if the data packet is a data packet based on the TCP, determining whether the filtered data packet, obtained immediately after the primary filtering has been performed, is a SYN packet or an ACK packet, storing the SYN packet or the ACK packet, extracting only a SYN packet or an ACK packet, having the IP address or the port number registered in the step (e), from stored SYN packets or ACK packets, and storing the extracted SYN packet or ACK packet. Preferably, the MIN in the step (d) may be extracted from a User-Agent field or a Phone-Number field of the header.

BRIEF DESCRIPTION OF THE DRAWINGS

The above and other objects, features and other advantages of the present invention will be more clearly understood from the following detailed description, taken in conjunction with the accompanying drawings, in which:

FIG. 1 is a network configuration view schematically showing a mobile communication system including a WAP gateway;

FIG. 2 is a view showing the installation of an apparatus for extracting WAP data using a mobile identification number according to the present invention; and FIG. 3 is a flowchart of a method of extracting WAP data using a mobile identification number according to the present invention.

DESCRIPTION OF THE PREFERRED EMBODIMENTS

Hereinafter, a method of extracting Wireless Application Protocol (WAP) data using a Mobile Identification Number according to preferred embodiments of the present invention will be described in detail with reference to the attached drawings.

FIG. 1 is a network configuration view schematically showing a mobile communication system including a WAP gateway. For convenience of description, the configuration of a Code Division Multiple Access (CDMA) network is shown as an example, but the network of the present invention is not limited to this network, and can also be applied to a Wideband CDMA (WCDMA). As shown in FIG. 1, the network configuration of a mobile communication system, including a WAP gateway, to which the method of the present invention can be applied, includes a plurality of mobile stations 10, a Base Transceiver Station (BTS) 20, a Base Station Controller (BSC) 30, a Packet Data Serving Node (PDSN) 40, a plurality of routers 50, a WAP gateway 60, and a web server 70 connected to the WAP gateway 60 through an IP network.

In the above configuration, the mobile stations 10 can be implemented using mobile phones, which are carried by users to enable communication while traveling, and Personal Digital Assistants (PDAs) or lap-top computers provided with a mobile communication function. The BTS 20 functions as a wireless antenna for transmitting or receiving wireless data between the mobile stations 10 and the BSC 30. Next, the base station controller 30 functions to transmit the data received from the BTS 20 to a higher stage, that is, the PDSN 40, thus controlling the connection between respective BTSs 20. The PDSN 40 functions as a gateway for managing the overall operation of connecting the mobile stations 10 and the wireless Internet without passing through a separate switching center, such as by assigning IP addresses to the mobile stations 10.

Next, the WAP gateway 60 functions as a gateway to the wireless Internet services of performing protocol conversion or encoding/decoding between the PDSN 40 and the web server 70.

FIG. 2 is a view showing the installation of an apparatus for extracting WAP data using a MIN according to the present invention. As shown in FIG. 2, the WAP data extraction apparatus using a MIN according to the present invention includes one or more tapping devices 80 and 90 disposed in locations previous or subsequent to the WAP gateway 60 to tap data which is transmitted through the WAP gateway 60, and a WAP data extraction device 100 for analyzing the data output from the tapping devices 80 and 90 and extracting WAP data.

In the above construction, the tapping devices 80 and 90 can be implemented using, for example, gigabit tapping devices. Meanwhile, the WAP data extraction device 100 may include a universal network interface card for communicating with respective tapping devices 80 and 90, and a microprocessor for analyzing data. In this way, the method of extracting data according to the present invention can be performed using universal equipment.

FIG. 3 is a flowchart of a method of extracting WAP data using a MIN according to the present invention, wherein solid lines indicate flows for WAP protocols supporting TCP, for example, WAP 2.0, and dotted lines indicate flows for WAP protocols supporting User Datagram Protocol (UDP), for example, WAP 1.3. Moreover, it is to be understood that, if there is no special description, this WAP data extraction method is performed by the microprocessor of the WAP data extraction device 100. According to the WAP data extraction method using a MIN of the present invention, the program is initiated by capturing all data packets passing through the stage previous or subsequent to the WAP gateway in step S10.

Next, in step S12, whether each of the packets captured in this way uses the IP address of a given WAP gateway as an intermediate IP address, or has a port corresponding to a Wireless Application Protocol (WAP), is determined (primary filtering). The IP address of the given WAP gateway must be registered in advance as a static IP address. Moreover, a WAP port number must also be registered in advance as, for example, '9201', which is a recommended port number. If the captured packet is determined to have neither the corresponding IP address nor the WAP port number in step S12, the process returns to step S10, whereas, if the captured packet is determined to have either the corresponding IP address or the WAP port number, the process proceeds to step S14 where whether a SYN flag bit is set in the captured packet is determined.

This step is described in detail. A TCP is a connection-oriented protocol, and uses a '3-way handshake' method to establish the connection between a client and a host. That is, in order to establish a connection, the client transmits a packet, in which a SYN flag bit is set in the TCP header thereof (hereinafter referred to as a 'SYN packet'), to the host, and the host transmits a packet, in which an ACK flag bit is set (of course, a SYN flag bit is also set) in the TCP header thereof (hereinafter referred to as an 'ACK packet), to the client as an acknowledgement for the SYN packet, thus agreeing with the initiation of a connection. The client resets a SYN flag bit and transmits a packet, in which an ACK flag bit is set, to the host, thus establishing the connection between the client and the host.

Referring back to FIG. 3, if a SYN flag bit is determined to be set in step S14, the process proceeds to step S16 where whether an ACK flag bit is set is determined. If the ACK flag bit is determined to be set, that is, if the captured packet is determined to be an ACK packet in step S16, the process proceeds to step S18 where the ACK packet is stored in a preset ACK/SYN storage unit. In contrast, if only the SYN flag bit is determined to be set, that is, if the captured packet is determined to be a SYN packet, the process proceeds to step S20 where the SYN packet is stored in a preset SYN storage unit. Thereafter, the process returns to step S10.

Meanwhile, if the captured packet is determined not to be a SYN packet in step S14, the process proceeds to step S22 where whether the captured packet is a packet requiring reassembly, that is, a fragmented packet, is determined. If the captured packet is determined to be a fragmented packet, the process proceeds to step S24 in which the fragmented packet is reassembled, and thereafter proceeds to step S26. In contrast, if the captured packet is determined to be a non-fragmented packet, the process proceeds directly to step S26. In this case, the determination of whether reassembly is required can be performed by checking a fragment offset flag bit, prescribed to be placed at a preset location in an IP packet.

Next, in step S26, whether the captured data packet is a header packet is determined. If the captured data packet is determined to be a header packet in step S26, the process proceeds to step S28 where whether a MIN is included in the header packet is determined. Such a MIN is included in the 'User-Agent' field of the header packet, which is required for billing. Since the configuration formats of headers before and after the header packet passes through the WAP gateway 60 are identical to that of an HTTP header, the User-Agent field can be extracted by applying a method of parsing the HTTP header to the User-Agent field without change. Since the HTTP header includes character strings that can be distinguished by carriage returns and line feeds, as shown in the following Table 1, a character string corresponding to 'User-Agent' is found and obtained from the character strings. From information about the character string, a MIN can be extracted. The following Table 1 shows examples of the items of the User-Agent field used in one mobile communication company in Korea.

TABLE 1

| Field item | Length |
| --- | --- |
| Company | 3 bytes |
| Protocol | 1 byte |
| mobile station type | 1 byte |
| Mobile station manufacturing company | 2 bytes |
| mobile station model | 2 bytes |
| browser manufacturing company | 2 bytes |
| browser version | 2 bytes |
| LCD pixel unit horizontal length | 3 bytes |
| LCD pixel unit vertical length | 3 bytes |
| LCD character unit horizontal length | 2 bytes |
| LCD character unit vertical length | 2 bytes |
| LCD representation color constant | 2 bytes |
| mobile station number (MIN) | 8 bytes |
| position information | Variable length |

The following Table 2 shows examples of company codes of mobile communication companies in Korea and prefixes corresponding to the company codes. In Table 2, each MIN can be extracted using a method of converting a company code, placed in a User-Agent field, into a prefix, combining the prefix with a MIN field value (subscriber number), and extracting the entire MIN. In this case, when the first digit of the mobile identification number (MIN) is 0, a seven-digit number is recognized as a MIN field value.

TABLE 2

| company code | Prefix | company code | prefix |
| --- | --- | --- | --- |
| SKT, I01 | 011 | KTF | 016 |
| STI, I17 | 017 | HSP | 018 |
| 010 | 010 | LGT | 019 |

Meanwhile, various types of request packets, transmitted from the client, which is the mobile station, to the host can be provided, for example, by determining whether an HTTP request field comes first in a TCP payload. Such requests may include 'OPTIONS', 'GET', 'POST', 'PUT', 'DELETE', 'TRACE' and 'CONNECTION' methods. In the header of each request packet, a 'User Agent' field is typically included. Further, in a procedure by which the host transmits a response to the request packet to the mobile station, which is the client, the IP address assigned to the mobile station is used as an identifier for identifying the mobile station. The following Table 3 is a table of HTTP response codes defined in RFC2616.

TABLE 3

| Code number | Meaning | Code number | Meaning |
| --- | --- | --- | --- |
| Informational 1xx | | | |
| 100 | Continue | 101 | Switching Protocols |
| Successful 2xx | | | |
| 200 | OK | 204 | No Content |
| 201 | Created | 205 | Reset Content |
| 202 | Accepted | 206 | 206 Partial Content |
| 203 | Non-Authoritative Information | | |
| Redirection 3xx | | | |
| 300 | 300 Multiple Choices | 303 | See Other |
| 301 | Moved Permanently | 304 | Not Modified |
| 302 | Not Found | 305 | Use Proxy |
| Client Error 4xx | | | |
| 401 | Unauthorized | 409 | Conflict |
| 402 | Payment Required | 410 | Gone |
| 403 | Forbidden | 411 | Length Required |
| 404 | Not Found | 412 | Precondition Failed |
| 405 | Method Not Allowed | 413 | Request Entity Too Large |
| 406 | Not Acceptable | 414 | Request-URI Too Long |
| 407 | Proxy Authentication Required | 415 | Unsupported Media Type |
| 408 | Request Timeout | | |
| Server Error 5xx | | | |
| 500 | Internal Server Error | 503 | Service Unavailable |
| 501 | Not Implemented | 504 | Gateway Timeout |
| 502 | Bad Gateway | 505 | HTTP Version Not Supported |

Referring back to FIG. 3, if the MIN is determined to be included in the header packet in step S28, whether the MIN is a registered MIN, for example, the MIN of a mobile station, the service quality of which is intended to be checked, is determined in step S30. If the MIN is determined to be the registered MIN in step S30, the process proceeds to step S32 where the IP address and the port number of the mobile station, included in the header packet, are extracted from the header packet and are registered. In step S34, only a SYN packet or an ACK packet having the registered IP address and port number is extracted from the SYN packets or ACK packets stored in step S18 step S20, and the extracted SYN or ACK packet is stored. Next, in step S40, a packet having the registered IP address and port number is extracted and stored.

If the MIN is determined not to be a registered MIN in step S30, the packet captured in this way is discarded, and thereafter the process returns to step S10. Further, if the captured packet is determined not to be a header packet in step S26, the process proceeds directly to step S38. Further, if a MIN is determined not to be included in the header packet in step 28, the process also proceeds directly to step S38. In step S38, whether the captured packet has the registered IP address and port number is determined (secondary filtering). When the captured packet is determined to have the registered IP address and port number, step S40 is performed; otherwise, the captured packet is discarded, and thereafter the process returns to step S10. This process is repeated until the connection between the mobile station and the host is released, and the resultant data packets are stored. In this way, all data packets, processed during a period from the establishment to release of the connection to an arbitrary mobile station, are stored, and thus problems can be detected by analyzing the data packets.

Meanwhile, since a UDP is a connection-less protocol, a procedure of 3-way handshaking is not prepared, unlike TCP, and thus a procedure for collecting a SYN packet or an ACK packet is not necessary. Accordingly, steps S14 to S20 and step S34 in FIG. 3 are not necessary, and the process proceeds directly to step S22 from step S12, as indicated by the dotted lines. Moreover, step S40 is performed immediately after step S32.

The method of extracting WAP data using a MIN according to the present invention is not limited to the above embodiments, and can be variously modified and implemented within the range allowed by the technical spirit of the present invention. For example, there may occur the case where no 'User-Agent' field is included in the header packet in step S28 of FIG. 3. In this case, a 'Phone-number' field is checked, and thus a MIN, included therein, is checked. Moreover, although both the IP address and the port number are used together to increase the filtering speed in the secondary filtering, the IP address can be used alone, and therefore the flowchart of FIG. 3 can be varied in consideration of this change. Therefore, the term "IP address or port number", described in 'step (e)' and 'step (f)' in claim 1 of the accompanying claims, should be interpreted to mean an IP address alone, or an IP address and a port number.

According to the WAP data extraction method using a MIN of the present invention, a MIN, which is a static factor, is used, so that there is no need to personally inquire of a manager about the IP address assigned to a given mobile station in a temporal restriction, thus more conveniently and promptly extracting WAP data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of extracting Wireless Application Protocol (WAP) data, comprising the steps of:
   (a) capturing all data packets passing through a WAP gateway;
   (b) performing primary filtering by determining whether each of the captured data packets uses an Internet Protocol (IP) address of the given WAP gateway as an intermediate IP address, or has a port corresponding to a WAP protocol;
   (c) determining whether a Mobile Identification Number (MIN) is present in a header of a data packet filtered at the primary filtering step;
   (d) determining whether the MIN is identical to a registered MIN if the MIN is determined to be present in the step (c);
   (e) registering an IP address or a port number included in the header while storing the data packet if the MIN is determined to be identical to the registered MIN in the step (d); and
   (f) performing secondary filtering on the data packet having the IP address or the port number, and storing a data packet filtered through the secondary filtering.

2. The method according to claim 1, wherein the data packet in the step (a) is extracted from at least one of stages previous and subsequent to the WAP gateway.

3. The method according to claim 2, wherein, when the data packet, filtered in the primary filtering step, is a fragmented data packet, the data packet is reassembled, and thereafter the step (c) is performed.

4. The method according to claim 3, wherein the data packet is a data packet based on a User Datagram Protocol (UDP).

5. The method according to claim 3, further comprising the steps of:
   if the data packet is a data packet based on a Transmission Control Protocol (TCP), determining whether the filtered data packet, obtained immediately after the primary filtering has been performed, is a SYN packet or an ACK packet, storing the SYN packet or the ACK packet, extracting only a SYN packet or an ACK packet, having the IP address or the port number registered in the step (e), from stored SYN packets or ACK packets, and storing the extracted SYN packet or ACK packet.

6. The method according to claim 1, wherein the MIN in the step (d) is extracted from a User-Agent field of the header.

7. The method according to claim 1, wherein the MIN in step (d) is extracted from a Phone-Number field of the header.

8. The method according to claim 2, wherein the MIN in the step (d) is extracted from a User-Agent field of the header.

9. The method according to claim 3, wherein the MIN in the step (d) is extracted from a User-Agent field of the header.

10. The method according to claim 4, wherein the MIN in the step (d) is extracted from a User-Agent field of the header.

11. The method according to claim 5, wherein the MIN in the step (d) is extracted from a User-Agent field of the header.

12. The method according to claim 2, wherein the MIN in step (d) is extracted from a Phone-Number field of the header.

13. The method according to claim 3, wherein the MIN in step (d) is extracted from a Phone-Number field of the header.

14. The method according to claim 4, wherein the MIN in step (d) is extracted from a Phone-Number field of the header.

15. The method according to claim 5, wherein the MIN in step (d) is extracted from a Phone-Number field of the header.

* * * * *